(12) United States Patent
Kim et al.

(10) Patent No.: US 9,426,684 B2
(45) Date of Patent: Aug. 23, 2016

(54) METHOD AND APPARATUS FOR RANDOM INTERFERENCE MEASUREMENT RESOURCE PATTERN DETERMINATION

(71) Applicant: Samsung Electronics Co., Ltd., Gyeonggi-do (KR)

(72) Inventors: Youn Sun Kim, Gyeonggi-do (KR); Hyo Jin Lee, Seoul (KR); Ju Ho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/404,431

(22) PCT Filed: May 29, 2013

(86) PCT No.: PCT/KR2013/004696
§ 371 (c)(1),
(2) Date: Nov. 26, 2014

(87) PCT Pub. No.: WO2013/180460
PCT Pub. Date: Dec. 5, 2013

(65) Prior Publication Data
US 2015/0111505 A1    Apr. 23, 2015

Related U.S. Application Data

(60) Provisional application No. 61/652,405, filed on May 29, 2012.

(51) Int. Cl.
| | |
|---|---|
| *H04B 17/00* | (2015.01) |
| *H04W 24/08* | (2009.01) |
| *H04J 11/00* | (2006.01) |
| *H04L 5/00* | (2006.01) |
| *H04B 7/02* | (2006.01) |
| *H04B 7/06* | (2006.01) |

(52) U.S. Cl.
CPC ........... *H04W 24/08* (2013.01); *H04J 11/0053* (2013.01); *H04L 5/005* (2013.01); *H04B 7/024* (2013.01); *H04B 7/0626* (2013.01); *H04L 5/0007* (2013.01); *H04L 5/0073* (2013.01)

(58) Field of Classification Search
CPC .................................................... H04W 24/08
USPC ............................................ 455/67.13, 67.11
See application file for complete search history.

(56) References Cited

U.S. PATENT DOCUMENTS

| | | |
|---|---|---|
| 2009/0196254 A1 | 8/2009 | Cha et al. |
| 2011/0086635 A1 | 4/2011 | Grob-Lipski |
| 2011/0299417 A1 | 12/2011 | Nanda et al. |
| 2013/0208604 A1* | 8/2013 | Lee et al. ............... 370/252 |

FOREIGN PATENT DOCUMENTS

| | | | |
|---|---|---|---|
| KR | 10-2011-0041972 | | 4/2011 |
| WO | WO 2011/010863 | * | 1/2011 |
| WO | WO 2011/010863 A2 | | 1/2011 |

OTHER PUBLICATIONS

International Search Report dated Sep. 27, 2013 in connection with International Patent Application No. PCT/KR2013/004696, 3 pages.
Written Opinion of International Searching Authority dated Sep. 27, 2013 in connection with International Patent Application No. PCT/KR2013/004696, 6 pages.

* cited by examiner

Primary Examiner — Nay A Maung
Assistant Examiner — Angelica M Perez

(57) ABSTRACT

A method and apparatus for transmitting feedback information is provided for use in a Cooperative Multi-Point downlink transmission of multiple base stations efficiently. An interference measurement method of a base station in a mobile communication system, the method comprising: allocating at least one Interference Measurement Resource (IMR) to a terminal; transmitting the allocated IMR to the terminal; and receiving at least one channel status information from the terminal; wherein allocating at least one IMR comprises allocating at least one IMR for the terminal overlapped to other IMR for the other terminal.

12 Claims, 17 Drawing Sheets

Fig. 10
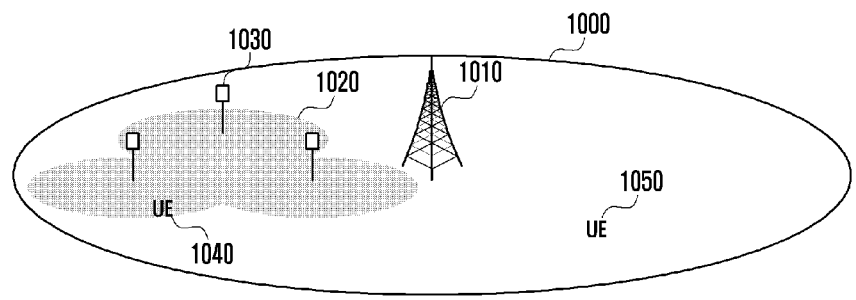
 LTE/LTE-A eNB      AP
Fig. 11
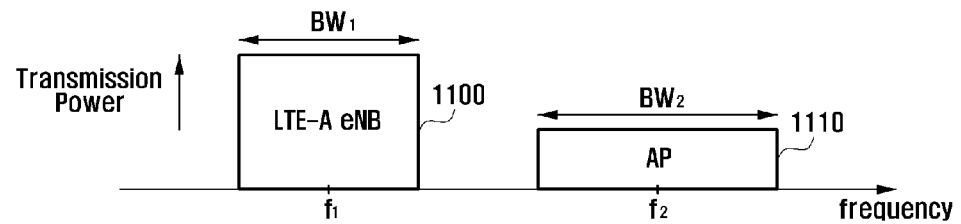
[Fig. 12]
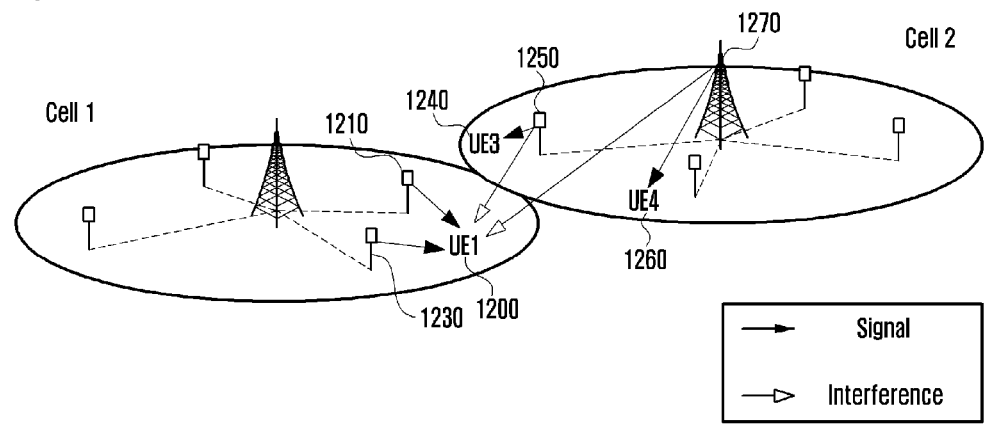

METHOD AND APPARATUS FOR RANDOM INTERFERENCE MEASUREMENT RESOURCE PATTERN DETERMINATION

CROSS-REFERENCE TO RELATED APPLICATION(S)

The present application claims priority under 35 U.S.C. §365 to International Patent Application No. PCT/KR2013/004696 filed May 29, 2013, entitled "METHOD AND APPARATUS FOR RANDOM INTERFERENCE MEASUREMENT RESOURCE PATTERN DETERMINATION". International Patent Application No. PCT/KR2013/004696 claims priority under 35 U.S.C. §365 and/or 35 U.S.C. §119(e) to U.S. Provisional Patent Application No. 61/652,405 filed May 29, 2012, which are incorporated herein by reference into the present disclosure as if fully set forth herein.

TECHNICAL FIELD

The present invention relates to a feedback method and apparatus for a cellular mobile communication system including plural base stations and, in particular, to a method and apparatus for transmitting feedback information for use in a Cooperative Multi-Point downlink transmission of multiple base stations efficiently.

BACKGROUND ART

A communication system includes a DownLink (DL) that conveys signals from one or more Transmission Points (TPs) to User Equipments (UEs), and an UpLink (UL) that conveys signals from UEs to one or more Reception Points (RPs). A UE, also commonly referred to as a terminal or a mobile station, may be fixed or mobile and may be a wireless device, a cellular phone, a personal computer device, etc. A TP or a RP is generally a fixed station and may also be referred to as a Base Transceiver System (BTS), a Node B, an enhanced Node B (eNB), an access point, etc.

A communication system also supports the transmission of several signal types for its proper functionality including data signals conveying information content, control signals enabling proper processing of data signals, and Reference Signals (RS), also known as pilots, enabling coherent demodulation of data or control signals or providing Channel State Information (CSI) corresponding to an estimate of the channel medium experienced by their transmission.

UL data information is conveyed through a Physical UL Shared CHannel (PUSCH). UL Control Information (UCI) is conveyed through a Physical UL Control CHannel (PUCCH) unless a UE also has a PUSCH transmission in which case the UE may convey at least some UCI together with data information through the PUSCH. The UCI includes ACKnowledgment information associated with the use of a Hybrid Automatic Repeat reQuest (HARM) process. The HARQ-ACK is in response to the reception by the UE of Transport Blocks (TBs) in the DownLink (DL) of the communication system, which corresponds to signal transmission from the Node B to the UE. The DL TBs are transmitted through a Physical Downlink Shared CHannel (PDSCH). The UCI may also include Channel Quality Indicator (CQI), or Precoding Matrix Indicator (PMI), or Rank Indicator (RI), which may be jointly referred to as Channel State Information (CSI). The CQI provides to the Node B a measure of the Signal to Interference and Noise Ratio (SINR) the UE experiences over sub-bands or over the whole operating DL BandWidth (BW). This measure is typically in the form of the highest Modulation and Coding Scheme (MCS) for which a predetermined BLock Error Rate (BLER) can be achieved for the transmission of TBs. The PMI/RI informs the Node B how to combine the signal transmission to the UE from multiple Node B antennas in accordance with the Multiple-Input Multiple-Output (MIMO) principle. A UE may transmit UCI either separately from data information in a Physical Uplink Control CHannel (PUCCH) or together with data information in a Physical Uplink Shared CHannel (PUSCH).

DL data information is conveyed through a Physical DL Shared CHannel (PDSCH). DL Control Information (DCI) includes DL CSI feedback request to UEs, Scheduling Assignments (SAs) for PUSCH transmissions from UEs (UL SAs) or for PDSCH receptions by UEs (DL SAs). The SAs are conveyed through DCI formats transmitted in respective Physical DL Control CHannels (PDCCHs). In addition to SAs, PDCCHs may convey DCI that is common to all UEs or to a group of UEs.

DCI also includes HARQ-ACK information that one or more TPs transmit to UEs through Physical HARQ-ACK Indicator CHannels (PHICHs) in response to respective receptions of data TBs transmitted from the UEs to RPs.

Typically, the PDCCHs are a major part of the total DL overhead. One method for reducing this overhead is to scale its size according to the resources required to transmit the PDCCHs and PHICHs. Assuming Orthogonal Frequency Division Multiple Access (OFDMA) as the DL transmission method, a Control Channel Format Indicator (CCFI) parameter can be transmitted through the Physical Control Format Indicator CHannel (PCFICH) to indicate the number of OFDM symbols allocated to the DL control region during a DL Transmission Time Interval (TTI).

DISCLOSURE OF INVENTION

Technical Problem

The present invention has been made to address at least the above problems and/or disadvantages and to provide at least the advantages described below. Accordingly, an aspect of the present invention provides a method and apparatus for Random Interference Measurement Resource Pattern Determination.

Solution to Problem

In accordance with an aspect of the present invention, an interference measurement method of a base station in a mobile communication system, the method comprising: allocating at least one Interference Measurement Resource (IMR) to a terminal; transmitting the allocated IMR to the terminal; and receiving at least one channel status information from the terminal; wherein allocating at least one IMR comprises allocating at least one IMR for the terminal overlapped to other IMR for the other terminal.

In accordance with another aspect of the present invention, an interference measurement method of a terminal in a mobile communication system, the method comprising: receiving at least one Interference Measurement Resource (IMR) from a base station; measuring an interference according to the received IMR; and transmitting at least one channel status information to the base station; wherein the base station configure to allocate at least one IMR for the terminal overlapped to other IMR for the other terminal.

In accordance with another aspect of the present invention, a base station of a mobile communication system, the terminal comprises: a transceiver which transmits and receives signals to and from a base station; and a control unit which controls the transceiver, allocates at least one Interference Measurement Resource (IMR) to a terminal, transmits the allocated IMR to the terminal; and receiving at least one channel status information from the terminal; wherein the control unit configure to allocate at least one IMR for the terminal overlapped to other IMR for the other terminal.

In accordance with another aspect of the present invention, a terminal of a mobile communication system, the terminal comprises: a transceiver which transmits and receives signals to and from a base station; and a control unit which controls the transceiver, receives at least one Interference Measurement Resource (IMR) from a base station, measures an interference according to the received IMR and transmits at least one channel status information to the base station; wherein the base station configure to allocate at least one IMR for the terminal overlapped to other IMR for the other terminal.

Advantageous Effects of Invention

Advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

FIG. 10 illustrates an exemplary deployment of LTE-A eNB and such AP transceivers within the coverage area of the LTE-A eNB that provide macro coverage.

FIG. 11 shows how the LTE-A eNB and APs utilize different frequency resources.

FIG. 12 illustrates an exemplary measurement of interference considering the cooperation between multiple TP (transmission point).

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present invention can be applied even to other communication systems having the similar technical background and channel format, with a slight modification, without departing from the spirit and scope of the present invention.

Figure 1:
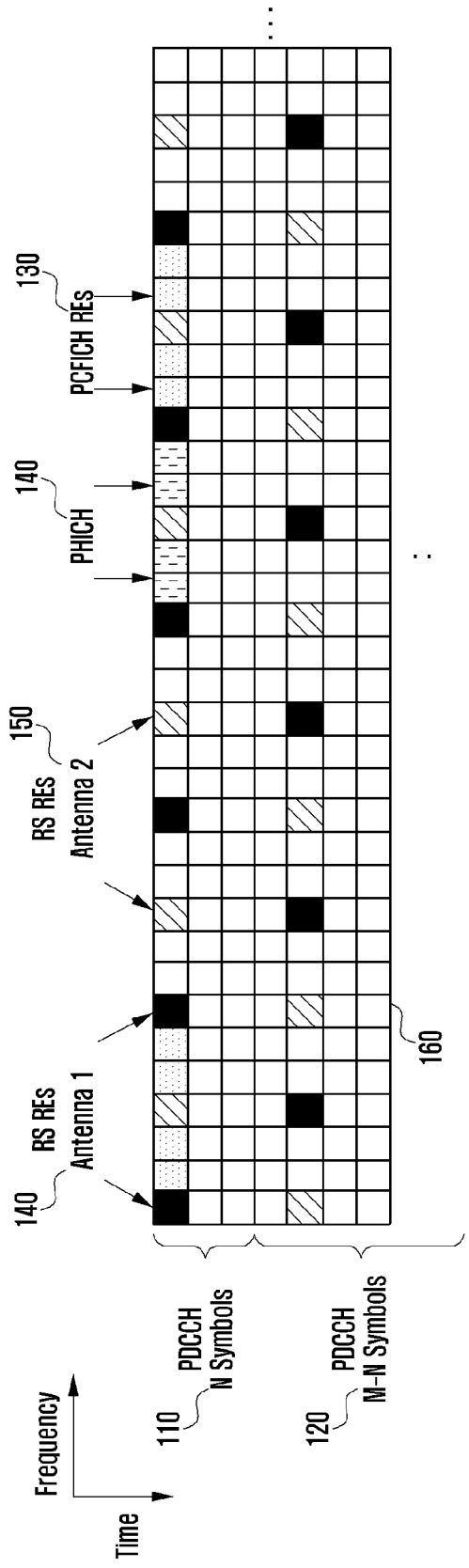
FIG. 1 illustrates a structure for the control region in a DL TTI which for simplicity is assumed to consist of one subframe having M OFDM symbols.

FIG. 1 illustrates a structure for the control region in a DL TTI which for simplicity is assumed to consist of one subframe having M OFDM symbols.

Referring to FIG. 1, the DL control region occupies the first N subframe symbols 110. The remaining M-N subframe symbols are assumed to be primarily used for PDSCH transmissions 120. The PCFICH 130 is transmitted in some subcarriers, also referred to as Resource Elements (REs), of the first symbol. The PCFICH is assumed to convey 2 bits indicating a PDCCH size of M=1, or M=2, or M=3 subframe symbols. The PCFICH 140 is also transmitted in some REs of the first subframe symbol. Moreover, some subframe symbols also contain RS REs, 150 and 160, that are common to all UEs for each of the transmitter antennas which in FIG. 1 are assumed to be two. The main purposes of the UE-Common RS (CRS) are to enable a UE to obtain a channel estimate for its DL channel medium and to perform other measurements and functions as they are known in the art. The remaining REs in the DL control region are used to transmit PDCCH.

PDCCH conveying SAs are not transmitted at predetermined locations in a DL control region and, as a consequence, each UE needs to perform multiple decoding operations to determine whether it has a SA in a DL subframe. To assist a UE with the multiple decoding operations, the REs carrying each PDCCH are grouped into Control Channel Elements (CCEs) in the logical domain. For a given number of DCI format bits, the number of CCEs for the DCI format transmission depends on the channel coding rate (Quadrature Phase Shift Keying (QPSK) is assumed as the modulation scheme). For UEs experiencing low or high Signal-to-Interference and Noise Ratio (SINR) in the DL, the serving TPs may respectively use a low or high channel coding rate for the PDCCH transmission in order to achieve a desired BLock Error Rate (BLER). Therefore, a PDCCH transmission to a UE experiencing low DL SINR may typically require more CCEs that a PDCCH transmission to a UE experiencing high DL SINR (different power boosting of the REs of a CCE transmission may also be used). Typical CCE aggregation levels for a PDCCH transmission are, for example, of 1, 2, 4, and 8 CCEs.

For a PDCCH decoding process, a UE may determine a search space for candidate PDCCHs, after it restores the CCEs in the logical domain, according to a common set of CCEs for all UEs (UE Common Search Space or UE-CSS) and according to a UE-dedicated set of CCEs (UE-Dedicated Search Space or UE-DSS). The UE-CSS may consist of the first $N_{CCE}^{UE-CCS}$ CCEs in the logical domain. The UE-DSS may be determined according to a pseudo-random function having as inputs UE-common parameters, such as the sub-frame number or the total number of CCEs in the subframe, and UE-specific parameters such as the UE identity (UE_ID). For example, for CCE aggregation levels $L \in \{1,2,4,8\}$, the CCEs for PDCCH candidate m are given by $L \cdot \{(Y_k+m) \bmod \lfloor N_{CCE,k}/L \rfloor\} + i$ where $N_{CCE,k}$ is the total number of CCEs in subframe k, i=0, ..., L−1, m=0, ..., $M^{(L)}$−1, $M^{(L)}$ is the number of PDCCH candidates to monitor in a search space, and $\lfloor \ \rfloor$ is the "floor" function rounding a number to its immediately smaller integer. Exemplary values of $M^{(L)}$ for $L \in \{1,2,4,8\}$ are, respectively, {0, 0, 4, 2} in the UE-CSS, and {6, 6, 2, 2} in the UE-DSS. For the UE-CSS, $Y_k=0$. For the UE-DSS, $Y_K=(A \cdot Y_{k-1}) \bmod D$ where $Y_{-1}=UE\_ID \neq 0$, A=39827 and D=65537.

PDCCHs conveying information to multiple UEs, such as for example a PDCCH conveying Transmission Power Control (TPC) commands for UEs to adjust their PUSCH or PUCCH transmission powers, are transmitted in the UE-CSS. Additionally, if enough CCEs remain in the UE-CSS after the transmission of PDCCHs conveying DCI to multiple UEs in a subframe, the UE-CSS may also be used to transmit PDCCH conveying SAs with some specific DCI formats. The UE-DSS is exclusively used to transmit PDCCHs providing SAs. For example, the UE-CSS may consist of 16 CCEs and support 2 PDCCHs with L=8 CCEs, or 4 PDCCHs with L=4 CCEs, or 1 PDCCH with L=8 CCEs and 2 PDCCHs with L=4 CCEs. The CCEs for the UE-CSS are placed first in the logical domain (prior to interleaving).

Figure 2:
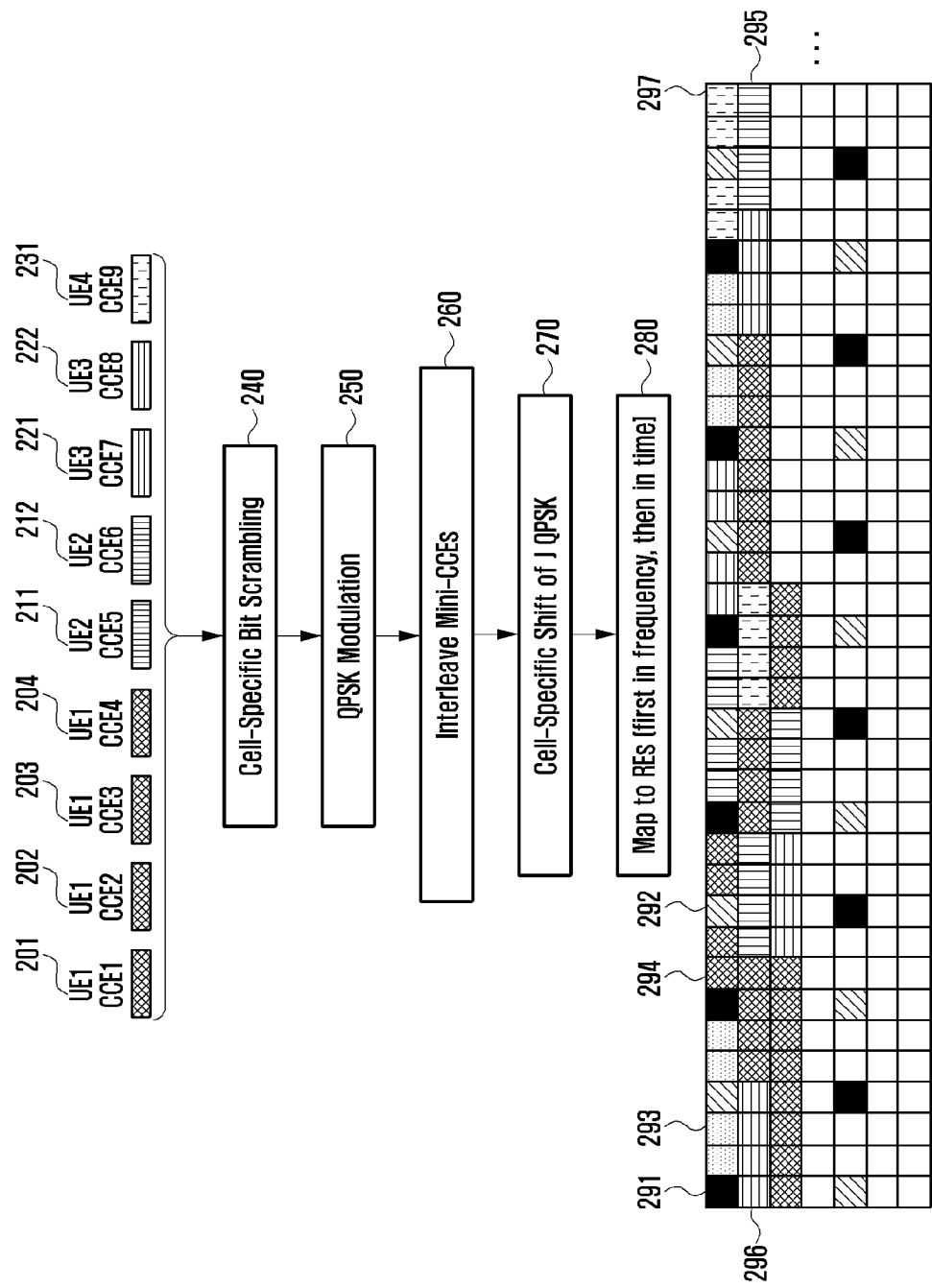
FIG. 2 illustrates a PDCCH transmission process.

FIG. 2 illustrates a PDCCH transmission process.

Referring to FIG. 2, after channel coding and rate matching, the encoded bits of DCI formats are mapped to CCEs in the logical domain. The first 4 CCEs (L=4), CCE1 201, CCE2 202, CCE3 203, and CCE4 204 are used for PDCCH transmission to UE1. The next 2 CCEs (L=2), CCE5 211 and CCE6 212, are used for PDCCH transmission to UE2. The next 2 CCEs (L=2), CCE7 221 and CCE8 222, are used for PDCCH transmission to UE3. Finally, the last CCE (L=1), CCE9 231, is used for PDCCH transmission to UE4. The DCI format bits of a PDCCH may be scrambled 240 with a binary scrambling code and are subsequently modulated 250. Each CCE is further divided into Resource Element Groups (REGs). For example, a CCE consisting of 36 REs can be divided into 9 REGs, each consisting of 4 REs. Interleaving 260 is applied among REGs (blocks of 4 QPSK symbols). For example, a block interleaver may be used where the interleaving is performed on symbol-quadruplets (4 QPSK symbols corresponding to the 4 REs of a REG) instead of on individual bits. After interleaving the REGs, the resulting series of QPSK symbols may be shifted by J symbols 270, and finally each QPSK symbol is mapped to an RE 280 in the DL control region of a subframe. Therefore, in addition to the RS from the transmitter antennas, 291 and 292, and other control channels such as a PCFICH or a PHICH 293, the REs in the DL control contain QPSK symbols corresponding to DCI format for UE1 294, UE2 295, UE3 296, and UE4 297.

Figure 3:
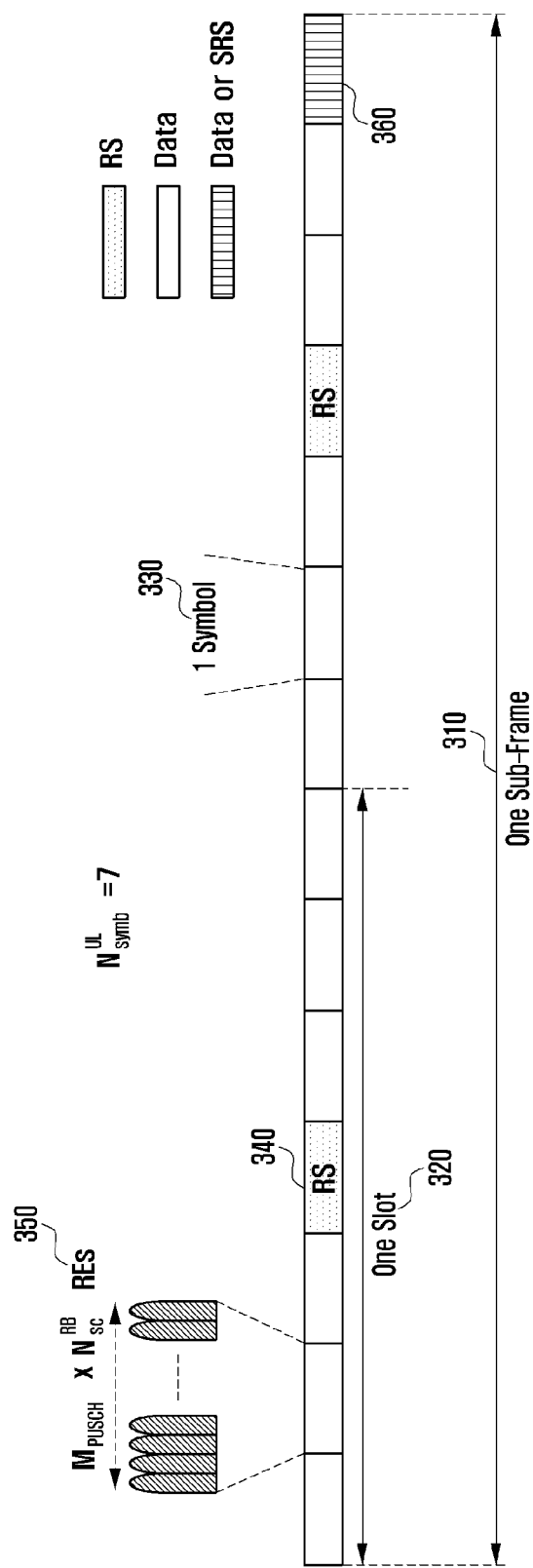
FIG. 3 illustrates an exemplary PUSCH transmission structure.

FIG. 3 illustrates an exemplary PUSCH transmission structure. For simplicity, the Transmission Time Interval (TTI) is consists of one sub-frame 310 which includes two slots. Each slot 320 includes $N_{symb}^{UL}$ symbols used for the transmission of data signals, UCI signals, or Reference Signals (RS). Each symbol 330 includes a Cyclic Prefix (CP) to mitigate interference due to channel propagation effects. The PUSCH transmission in one slot may be either at the same BW or at a different BW than the PUSCH transmission in the other slot. Some symbols in each slot are used to transmit RS 340 which enables channel estimation and coherent demodulation of the received data and/or UCI signals. The transmission BW consists of frequency resource units which will be referred to as Physical Resource Blocks (PRBs). Each PRB consists of $N_{sc}^{RB}$ sub-carriers, or Resource Elements (REs), and a UE is allocated $M_{PUSCH}$ PRBs 350 for a total of $M_{sc}^{PUSCH}=M_{PUSCH} \cdot N_{sc}^{RB}$ REs for the PUSCH transmission BW. The last sub-frame symbol may be used for the transmission of Sounding RS (SRS) 360 from one or more UEs. The main purpose of the SRS is to provide the Node B a CQI estimate for the UL channel medium for the respective UE. The SRS transmission parameters for each UE are semi-statically configured by the Node B through higher layer signaling. The number of sub-frame symbols available for data transmission is $N_{symb}^{PUSCH}=2 \cdot (N_{symb}^{UL}-1)-N_{SRS}$, where $N_{SRS}=1$ if the last sub-frame symbol is used for SRS transmission and $N_{SRS}=0$ otherwise.

Figure 4:
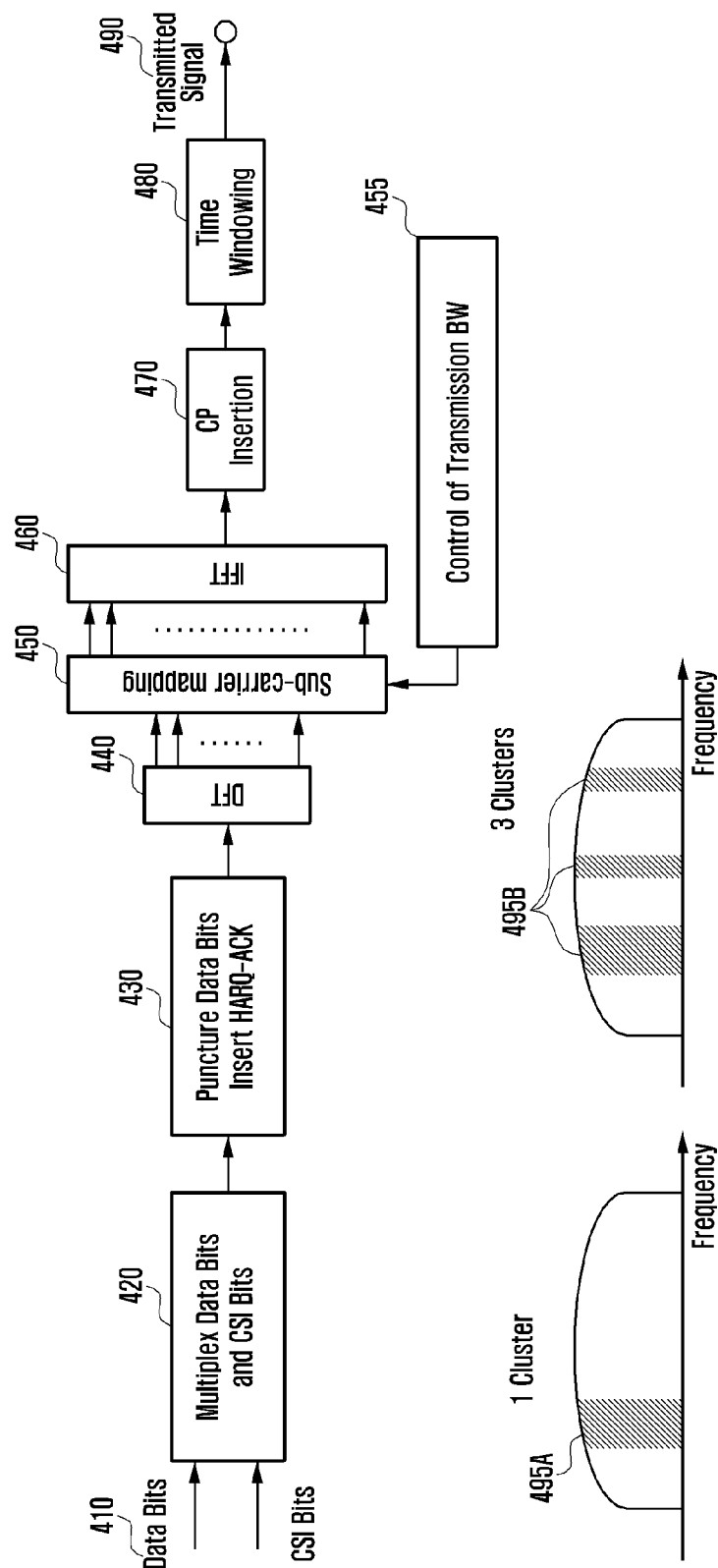
FIG. 4 illustrates an exemplary transmitter block diagram for the transmission of data, CSI, and HARQ-ACK signals in the PUSCH.

FIG. 4 illustrates an exemplary transmitter block diagram for the transmission of data, CSI, and HARQ-ACK signals in the PUSCH. Coded CSI bits 405 and coded data bits 410 are multiplexed 420. HARQ-ACK bits are then inserted by puncturing data bits and/or CSI bits 430. The Discrete Fourier Transform (DFT) is then obtained 440, the REs 450 corresponding to the PUSCH transmission BW are selected 455, the Inverse Fast Fourier Transform (IFFT) is performed 460 and finally the CP 470 and filtering 480 are applied to the transmitted signal 490. For brevity, additional transmitter circuitry such as digital-to-analog converter, analog filters, amplifiers, and transmitter antennas are not illustrated. Also, the encoding process for the data bits and the CSI bits, as well as the modulation process for all transmitted bits, are omitted for brevity. The PUSCH transmission is assumed to be over clusters of contiguous REs in accordance to the DFT Spread Orthogonal Frequency Multiple Access (DFT-S-OFDM) method allowing signal transmission over one cluster 495A (also known as Single-Carrier Frequency Division Multiple Access (SC-FDMA)), or over multiple non-contiguous clusters 495B.

Figure 5:
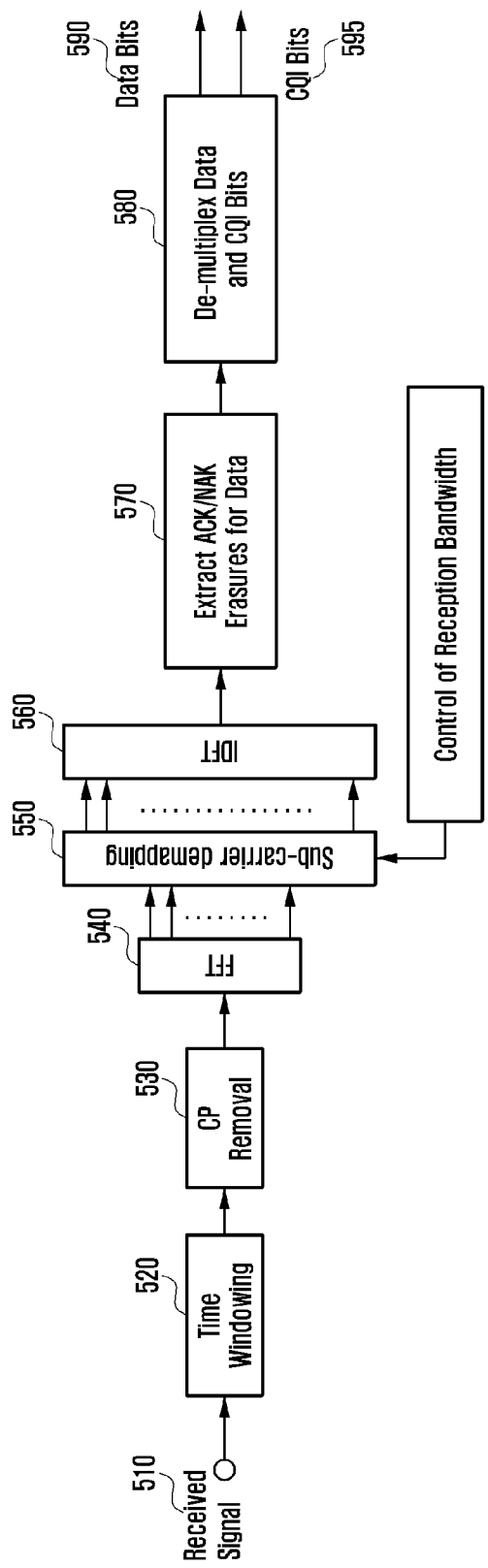
FIG. 5 illustrates an exemplary reverse (complementary) transmitter operations at a receiver.

At the receiver, the reverse (complementary) transmitter operations are performed. This is illustrated in FIG. 5 where the reverse operations of those illustrated in FIG. 4 are performed. After an antenna receives the Radio-Frequency (RF) analog signal and after further processing units (such as filters, amplifiers, frequency down-converters, and analog-to-digital converters) which are not shown for brevity, the digital signal 510 is filtered 520 and the CP is removed 530. Subsequently, the receiver unit applies a Fast Fourier Transform (FFT) 540, selects 550 the REs 560 used by the transmitter, applies an Inverse DFT (IDFT) 570, and de-multiplexes 580 the data bits 590 and CSI bits 595. As for the transmitter, well known receiver functionalities such as channel estimation, demodulation, and decoding are not shown for brevity.

Figure 6:
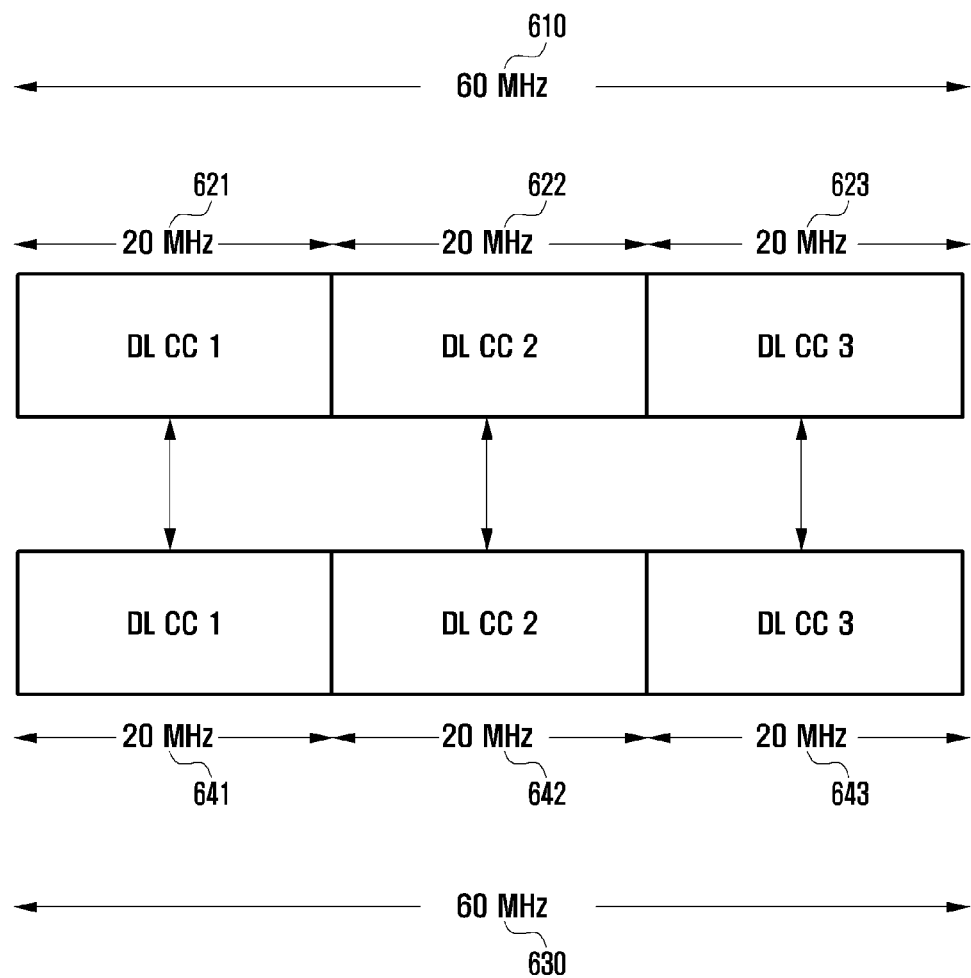
FIG. 6 illustrates the principle of CC aggregation.

In order to support higher data rates than possible in legacy communication systems, aggregation of multiple Component Carriers (CCs) (which is called as carrier aggregation (CA)) is considered in both the DL and the UL to provide higher operating BWs. For example, to support communication over 60 MHz, aggregation of three 20 MHz CCs can be used. FIG. 6 further illustrates the principle of CC aggregation. An operating DL BW of 60 MHz 610 is constructed by the aggregation of 3 (contiguous, for simplicity) DL CCs, 621, 622, 623, each having a BW of 20 MHz. Similarly, an operating UL BW of 60 MHz 630 is constructed by the aggregation of 3 UL CCs, 641, 642, 643, each having a BW of 20 MHz. For simplicity, in the example of FIG. 6, each DL CC is assumed to be uniquely mapped to an UL CC (symmetric CC aggregation) but it is also possible for more than 1 DL CC to be mapped to a single UL CC or for more than 1 UL CC to be mapped to a single DL CC (asymmetric CC aggregation, not shown for brevity). The link between DL CCs and UL CCs is typically UE-specific.

The Node B configures CCs to a UE using higher layer signaling, such as for example Radio Resource Control (RRC) signaling. The RRC-configured DL CCs can be activated or deactivated by Medium Access Control (MAC) signaling or PHYsical (PHY) layer signaling (activation/deactivation for each RRC-configured UL CC is determined by the activation/deactivation of its linked DL CC). Activation of a DL (UL) CC for a UE means that the UE can receive PDSCH (transmit PUSCH) in that CC; the reverse applies for deactivation of a DL (UL) CC. In order to maintain communication, one DL CC, and one UL CC linked to that DL CC, need to remain activated and they will be respectively referred to as DL Primary CC (DL PCC) and UL Primary CC (UL PCC).

Aperiodic CSI report via PUSCH is triggered by CSI Request field in PDCCH. In following description, the serving cell is corresponding to the each carrier component (CC). Upon decoding an indication sent in the scheduling grant for serving cell c, aperiodic CSI reporting is performed using PUSCH on serving cell c. If the CQI request field is 1 bit, a report is triggered if CQI request field is set to '1'. If the CQI request field is 2 bits, a report is triggered as follows.

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

For example, when carrier indicator field (CIF) is 1 (bits '001') and CSI Request field is bits '01', then the CSI of DL CC 1 which is linked to UL CC1 due to CIF is feedback to Node B. When CSI Request field is bits '10', then depending on the higher layer configuration, the CSI(s) of DL CC(s) is/are feedback to Node B.

Improving coverage and cell-edge throughput are key objectives in communication systems. Coordinated Multi-Point transmission/reception (CoMP) is an important technique to achieve these objectives. CoMP operation relies on the fact that when a UE is in a cell-edge region, it may be able to reliably receive signals from a set of TPs (DL CoMP) and reliably transmit signals to a set of RPs (UL CoMP). DL CoMP schemes can range from simple ones of interference avoidance, such as coordinated scheduling, to more complex ones requiring accurate and detailed channel information such as joint transmission from multiple TPs. UL CoMP schemes can also range from simple ones where PUSCH scheduling is performed considering a single RP to more complex ones where the received signal characteristics and the generated interference at multiple RPs are considered.

Figure 7:
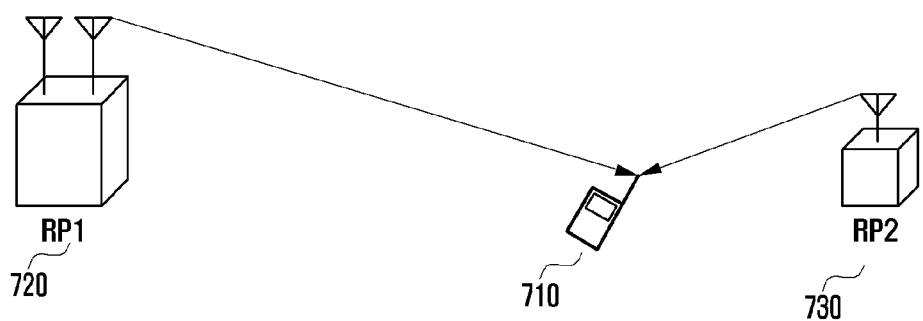
FIG. 7 illustrates one example of DL CoMP operation.

FIG. 7 illustrates one example of DL CoMP operation.

Referring to FIG. 7, a signal transmitted by two RPs, RP1 720 and RP2 730 is received from a UE 710. Scheduling coordination between the two RPs and combining of the transmitted signals can be facilitated by a fast backhaul link such as an optical fiber link.

Support of DL CoMP introduces new CSI feedback for various CoMP schemes. As legacy CSI feedback considers only one transmission point (TP) and one CSI reference signal for the channel measurement and CSI feedback report, it is not possible to support the CoMP schemes from multiple transmission points which utilize multiple CSI reference signals. For this reason, the additional CSI feedback for multiple TP (or CSI feedback for corresponding CSI-RS configurations) is required to support DL CoMP schemes. Feedback for CoMP schemes can be categorized as follows.

Multiple CSI reports for multiple TPs (transmission point)
  Node B configures multiple CSI-RS configurations to a UE for CSI reports.
  Each CSI-RS configuration corresponds to a specific TP.
  The case where one CSI-RS configuration corresponds to multiple TPs is also included.
  The set of multiple CSI-RS configurations (or the corresponding TPs) for CSI reports is defined as "feedback set (or measurement set)"
  Each CSI report corresponds to a CSI-RS configuration for a TP
Additional feedback for dynamic point selection with dynamic blanking (DS/DB)
  Some TPs (e.g. macro Node B) can be turned off (blanking) in order to help downlink data reception of UEs attached to other TPs
  One UE needs to feedback additional CSI for blanking
Additional feedback for joint transmission (JT)
  Multiple TPs can simultaneously transmit data for one UE.
  JT may require additional CSI for co-transmission from multiple TPs The CSI report for CoMP may be transmitted either separately from data information in a Physical Uplink Control CHannel (PUCCH) or together with data information in a Physical Uplink Shared CHannel (PUSCH). Therefore, there is a need to provide CSI report for CoMP via PUSCH and PUCCH respectively.

The need to provide CSI report for CoMP via PUSCH is associated with an increased size of CSI feedback information. Because multiple CSI reports are required for CoMP, the amount of feedback is not enough for PUCCH when multiple CSI reports are feedback simultaneously.

There is another need to provide CSI report for CoMP via PUSCH to include additional feedback for DS/DB or JT. These CoMP schemes require not only per-TP CSI feedback but also additional CSI feedback which is conditioned on certain interference assumption, or which includes inter-TP information for co-transmission from multiple TPs.

Figure 8:
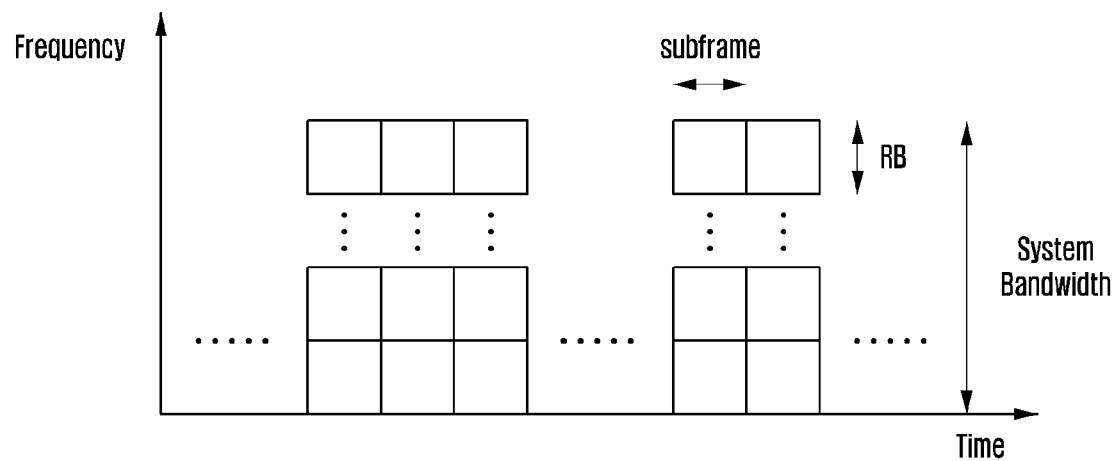
FIG. 8 illustrates an exemplary system bandwidth of LTE-A consists of multiple RBs in the frequency domain and multiple subframes in the time domain.

Downlink transmission of LTE and LTE-A are made in units of subframes in the time domain and RBs in the frequency domain. A subframe equals to 1 msec of transmission time while an RB equals to 180 kHz of transmission bandwidth consisting of 12 subcarriers. The system bandwidth of LTE-A consists of multiple RBs in the frequency domain and multiple subframes in the time domain as depicted in FIG. 8.

A number of different signals are transmitted for LTE-A Release 10 and releases after Release 10. In the downlink, the following reference signals are transmitted:

Cell Specific Reference Signal (CRS): Used for initial system access, paging, PDSCH demodulation, channel measurement, handover, etc Demodulation Reference Signal (DMRS): Used for demodulation of PDSCH Channel Status Information Reference Signal (CSI-RS): Used for channel measurement In addition to the above reference signals, zero-power CSI-RS can be applied in LTE-A Release 10. Zero-power CSI-RS can occur in the same time and frequency resources as CSI-RS but differ from CSI-RS in that there is no signal transmitted on the REs which are subject to zero-power CSI-RS. The purpose of zero-power CSI-RS is to not transmit on resources which are used by neighboring TPs for CSI-RS transmission so as to not generate interference on these CSI-RS transmitted by neighboring TPs. The resources which are used for transmission of the above reference signals, zero power CSI-RS, PDSCH, control channels are depicted in FIG. 9.

Figure 9:
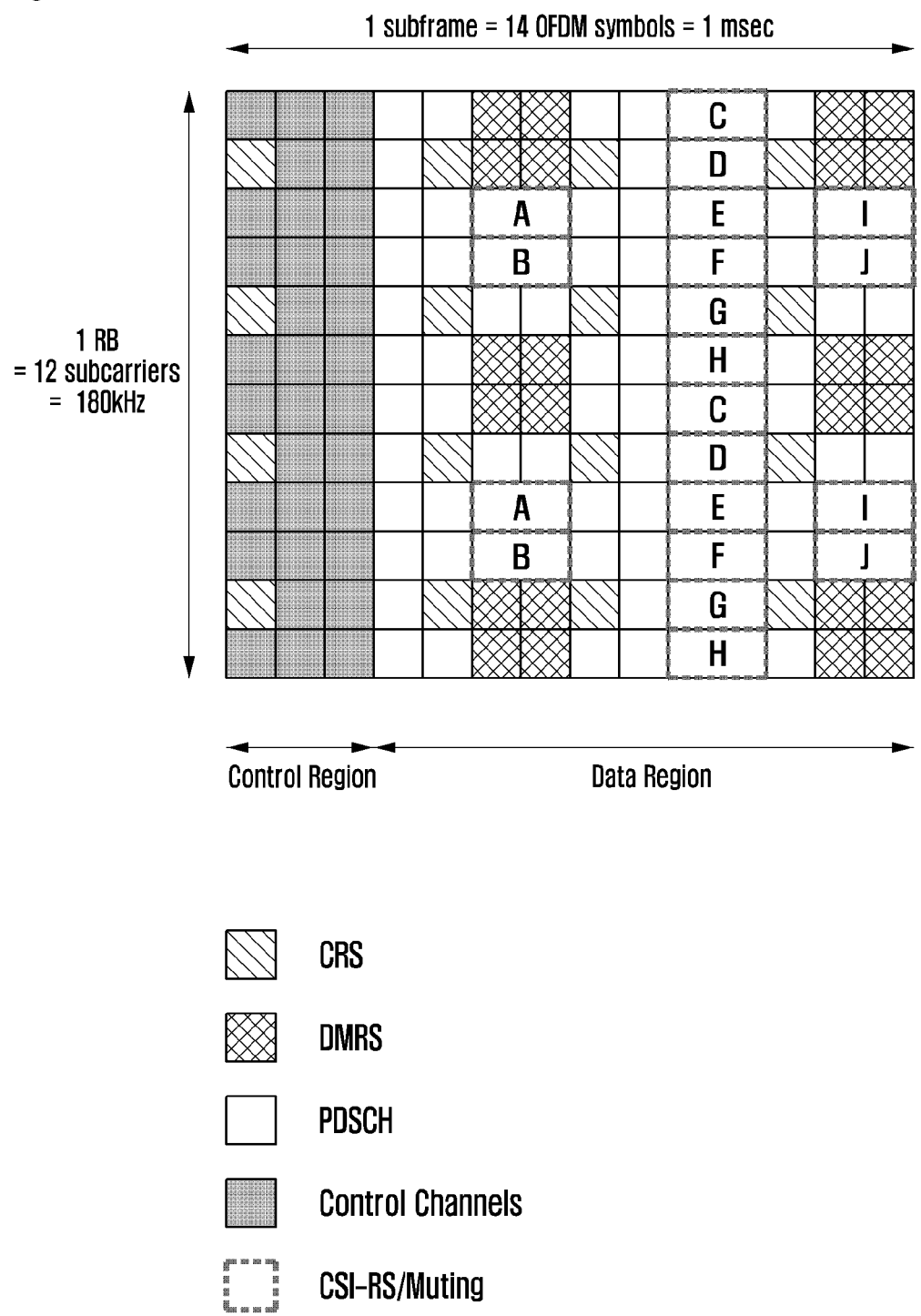
FIG. 9 illustrates an exemplary resources which are used for transmission of the above reference signals, zero power CSI-RS, PDSCH, control channels.

FIG. 9 depicts the location of resources used for transmission of different reference signals, PDSCH, zero power CSI-RS and control channels. Note the above diagram is for a single RB in the frequency domain for a single subframe in the time domain. For each subframe, multiple RBs may exist and the above signals can be transmitted on multiple RBs in a similar manner as shown in FIG. 9. The resources marked by alphabets A, B, C, D, E, F, G, H, I, J in FIG. 9 corresponds to locations where transmission for CSI-RS having 4 antenna ports. For example, in the 4 REs marked by 'A', CSI-RS having 4 antenna ports can be transmitted. CSI-RS having 2 antenna ports can be transmitted on resources which are obtained by dividing the resources for CSI-RS having 4 antenna ports into 2. Additionally, CSI-RS having 8 antenna ports can be transmitted on resources which are obtained by combining the 2 resources for CSI-RS having 4 antenna ports. Zero-power CSI-RS can be applied on the resources for CSI-RS having 4 antenna ports.

Multiple frequency bands can be used in conjunction to provide enhanced data service to mobile terminals in LTE-A network. One such alternative is to deploy APs based on radio access technology other than LTE-A which utilize different frequency bands compared to the LTE-A system within the macro coverage area of LTE-A system. Some examples of such radio access technologies can be WiFi (802.11x where 'x' can be a, b, g, n, ac, etc), WiBro/WiMax, telecommunication systems on unlicensed bands, telecommunication systems on millimeter bands (where carrier frequency is higher than 5 GHz). Another alternative is to deploy APs based on LTE-A which utilize different frequency bands compared to the LTE-A system providing macro coverage. FIG. 10 depicts the deployment of LTE-A eNB and such AP transceivers within the coverage area of the LTE-A eNB that provide macro coverage.

As shown in FIG. 10, in addition to the LTE-A eNB (1010), one or more APs (ex. 1030) can be deployed within the coverage of a LTE-A eNB (1000). Typically, these APs would be located in areas of high traffic demand in order to offload traffic from the LTE-A eNB. The APs would utilize frequency resources which are different from those of the LTE-A eNB. For example, LTE-A may utilize frequency resource having system bandwidth of 20 MHz on carrier frequency of 2 GHz while the APs in FIG. 10 may utilize frequency resource having system bandwidth of 100 MHz on carrier frequency of 30 GHz. An example of how the LTE-A eNB and APs utilize different frequency resources is shown in FIG. 11.

Note that in FIG. 11, the signal transmitted by the LTE-A eNB and AP are different in terms of the transmission power, the carrier frequency, and the bandwidth.

Offloading the LTE-A's traffic onto the APs would allow the UEs near APs (ex. 1040) to experience better wireless experience by utilizing the AP's wireless resources while allowing more of the LTE-A eNB's wireless resources to be diverted to UEs which are not near the APs (ex. 1050). In addition to offloading, carrier aggregation can also be used such that a UE receives or/and transmits data on both the LTE-A and AP's frequency resources. Utilizing both LTE-A eNB and AP's frequency resources using the carrier aggregation approach would allow the UE to access higher data rates since the total bandwidth is larger than compared to using only one of either LTE-A eNB's frequency resource or AP's frequency resource.

While there are benefits of offloading LTE-A eNB's traffic to APs and simultaneously using both the LTE-A eNB's frequency resources and APs' frequency resources, there is a difficulty in doing either. One notable difficulty for the UE is the detection of whether an AP is nearby or not. Unlike an LTE-A system where system wide coverage is provided, APs may provide coverage only for traffic hot spots as shown in FIG. 10 (1020). Therefore, in order to determine whether or not to offload a UE to an AP requires detection of APs in the UE's proximity. In other words, a UE needs to determine whether there are APs nearby its location. The existing method of detecting an AP is to turn on the UE's RF and baseband circuitry for the frequency band used by the AP to determine the existence of the AP. The UE would determine the existence of nearby APs by measuring the strength of the signals received on the frequency bands used by the APs. For example, a UE which is connected to an LTE-A eNB using a carrier frequency of 2 GHz would need to additionally turn on its RF and baseband circuitry to receive signals from an AP on a carrier frequency of 10 GHz. Although such an approach could allow the UE to successfully detect nearby APs, it would mean that the UE would need to turn on its RF and baseband circuitry even when there are no APs nearby. Turning on a UE's RF and baseband circuitry in order to receive signals on the frequency bands used by the APs therefore generates additional battery power consumption which is undesirable.

One of the key issues in CoMP is the measurement of interference considering the cooperation between multiple TP (transmission point)s. For example, consider a multi-cell system shown in FIG. 12.

In FIG. 12, UE1 is receiving cooperative transmission from TPs 1210 and 1230. In order to support efficient AMC (adaptive modulation and coding) operation, the UE has to accurately measure not only the signal from the two TPs but the magnitude of the interference from the interfering TPs 1250 and 1270. The function of the signal energy measured from TPs 1210, 1230 and the magnitude of interference measured from TPs 1250, 1270 determines the MCS (modulation coding scheme) level of the downlink transmission from TPs 1210, 1230.

Figure 13:
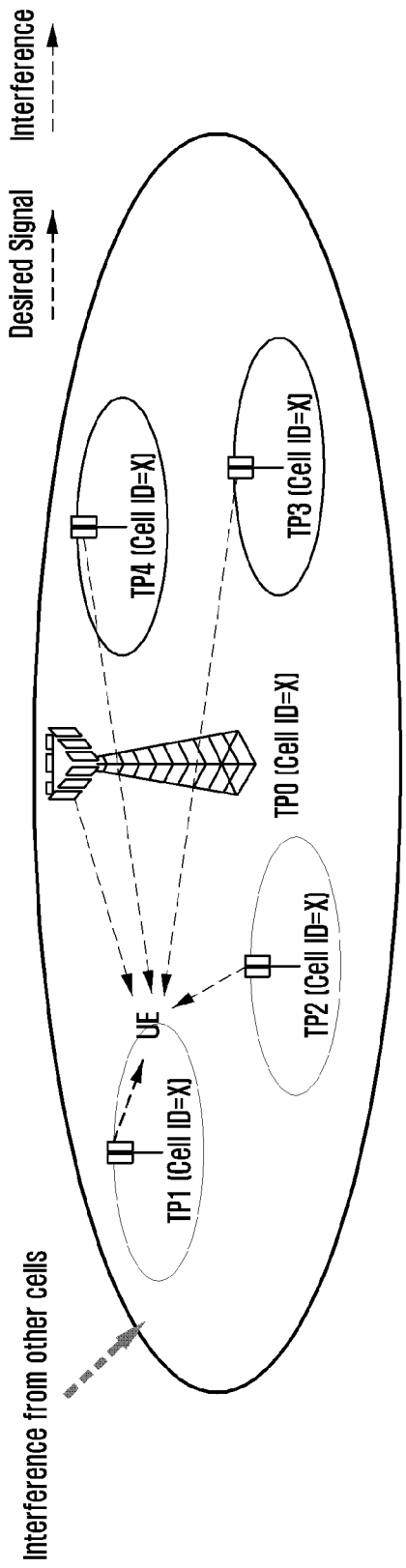
FIG. 13 illustrates an exemplary interference situation under CoMP.

In LTE Release 8, 9, and 10, interference measurement has been to a large extent a UE implementation issue based on CRS. The inter-cell interference from neighbouring cells can be measured using different implementation methods such as assessing the interference level from excessive delay components of the serving cell's CRS or directly measuring the CRS transmitted by the interfering cells. Such mechanisms for interference measurement can be also applied for Release 11 CoMP scenarios 1, 2, and 3 since each TP in these scenarios has its own CRS. However, this is not the case for scenario 4 where multiple TPs may share the same Cell ID and as a consequence identical CRS sequence is transmitted from two geographically separated TPs. FIG. 13 shows an interference situation under CoMP scenario 4.

In FIG. 13, the UE is receiving or intending to receive PDSCH transmission from TP1 and therefore receives interference from TPs with Cell ID=X which are the TPs in the same macro area sharing the same Cell ID TPs with Cell ID≠X which are the TPs in the neighbouring macro area Although TPs 0, 2, 3, and 4 generate interference to the UE when PDSCH is transmitted from TP1 to the UE, all the TPs transmit identical CRS sequence and as a result interference from these TPs cannot be assessed accurately by simply relying on Release 8, 9, 10 interference estimation schemes based on CRS.

The consequence of inaccurate interference estimation in CoMP scenarios may be especially harsh to CoMP UEs since they are more likely to be located in regions where the interference level is high and an accurate estimation is necessary for efficient interference management. Based on the above observation, we propose that specification support be provided in Release 11 that allows simple and accurate interference measurement from neighbouring TPs with shared Cell ID.

There are two types of interference in CoMP. The following lists and describes the relevant types of interference.

Figure 14:
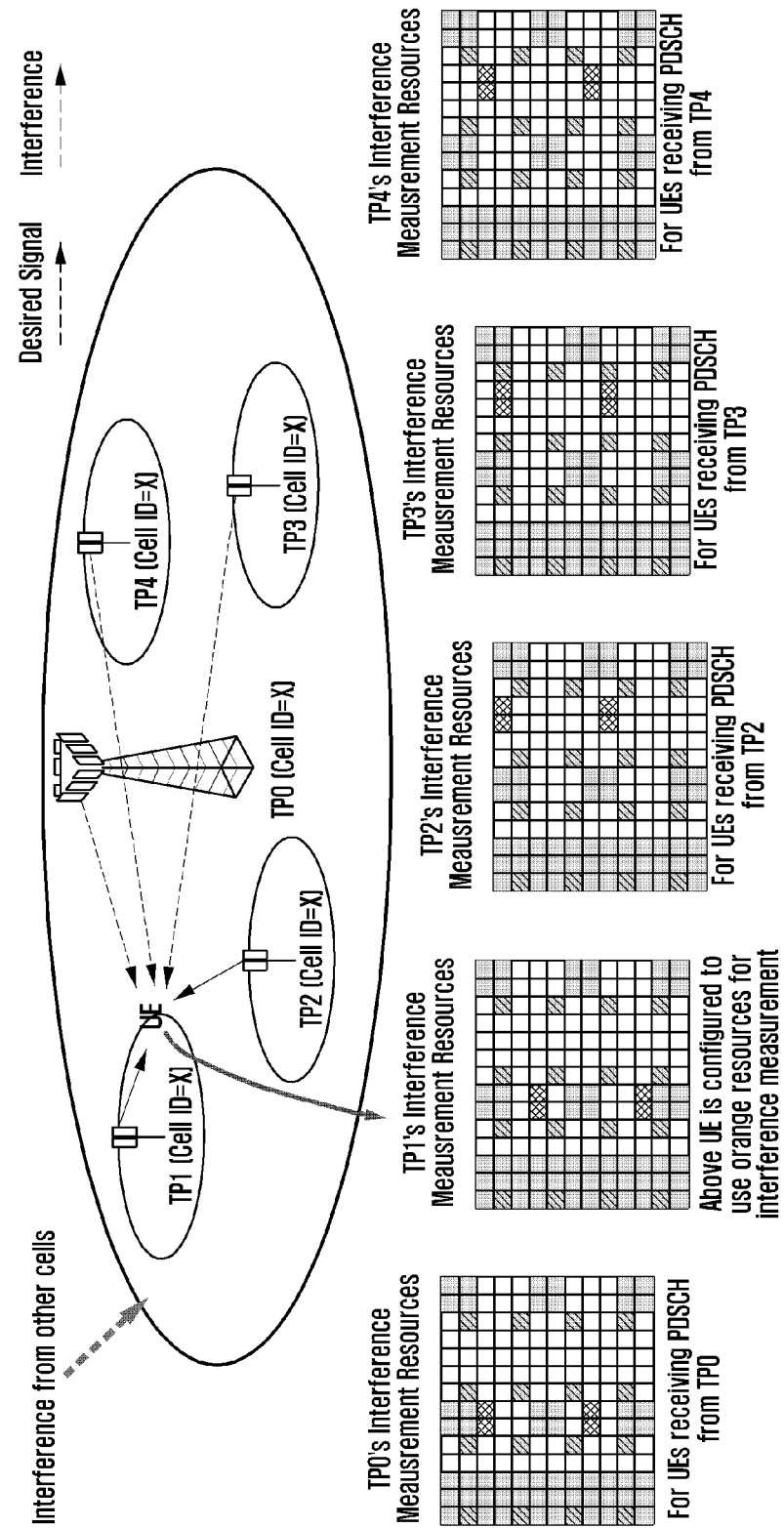
FIG. 14 shows shows how REs which can be used for inter-TP interference measurement is allocated in a TP.

Interference from TPs outside the set of cooperative TPs
Interfering TPs within the set of cooperative TPs There are essentially two possible ways of measuring interference for CoMP operation. The first is the use zero power CSI-RS or muted resources. Another alternative to interference measurement is to utilize muted resources. In this alternative, a set of REs would be signalled to the UE for interference measurement. These resources will be muted off from the TP that is to serve the UE and would facilitate the UE to measure the interference that is generated from the other TPs. Since the set of REs are muted off from the TP that is to serve the UE, the only signal that the UE can receive from these REs would be the transmission from the other TPs which are inter-TP interference. The PDSCH RE muting feature which was adopted Release 10 can be utilized for this purpose. FIG. 14 shows how REs which can be used for inter-TP interference measurement is allocated in a TP specific manner to 5 TPs with a shared Cell I.D.

The UE in FIG. 14 which is receiving or intending to receive PDSCH transmission from TP1 would be notified via RRC signalling that it should use the orange resources for interference measurement. TP1 will mute off these orange resources allowing the UE to receive the interference generated from the other TPs with same Cell ID. Note that in addition to the interference from the other TPs with the same Cell ID, the UE will be able to receive the interference from other cells allowing a single interference measurement for both inter-cell and inter-TP (same Cell ID) interference.

The specification support needed to realize the above is the definition of interference measurement resources and the RRC signalling that notifies of these resources to the UE. The interference measurement resources would be defined as one of multiple PDSCH RE muting (or zero power CSI-RS) patterns that are already available in Release 10. Not defining a new set of patterns and just reusing the existing PDSCH RE muting patterns has the benefit that it can be realized without any backward compatibility issues to Release 10. Therefore, a single set of interference measurement resources would be one of 10 PDSCH RE muting patterns (in FDD) and would require an overhead of 4 REs per PRB pair for subframes with such interference measurement resources. The time periodicity of these interference measurement resources does not have to be short resulting in a typically small overhead (ex: 0.2% wireless resources for periodicity of 10 msec).

Additionally, in order to allow the UE to measure for different interference situations, it would be beneficial to allow the definition of multiple interference measurement resources. For example, the CoMP schemes may supported dynamic blanking which turns off the transmission power of a certain TP for the benefit of UEs receiving PDSCH from other TPs. In such cases, it would be necessary to measure a common CSI-RS from a single TP but have multiple interference measurement resources take can accurately reflect the different inter-TP interference of the case when there is no blanking and when there is blanking. For example, a UE might be configured as follows:

TABLE 1

| Configured CSI-RS | Configured Interference Measurement Resources | Interference from other TPs (with reference to FIG. 2) |
| --- | --- | --- |
| CSI-RS configuration A | PDSCH RE Muting Pattern B | Interference from TPs 0, 2, 3, 4 |
| | PDSCH RE Muting Pattern C | Interference from TPs 2, 3, 4 |

Figure 15:
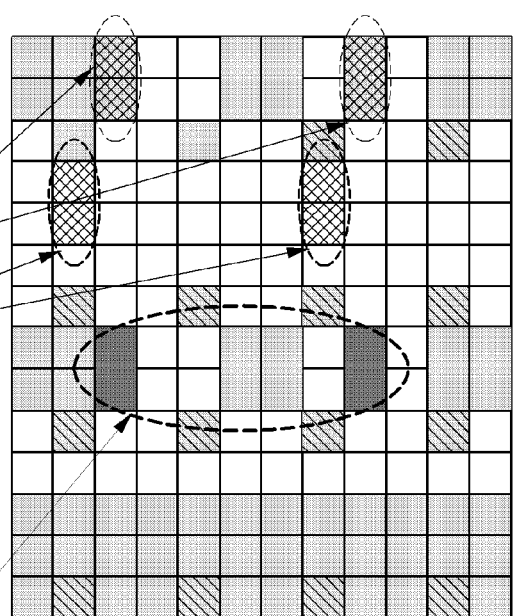
FIG. 15 illustrates an exemplary resources.

In Table 1, the UE is notified of two interference measurement resources which can be used to assess interference levels for different cases. For example, one of the resources in Table 1 and FIG. 15 (PDSCH RE Muting Pattern B) would be used to assess the interference level for the case where the transmission of the high power TP (TP0) in FIG. 15 is not blanked while the other resource (PDSCH RE Muting Pattern C) is used to assess the interference level for the case where the transmission of the high power TP is blanked. Accordingly, the network will configure PDSCH muting on Muting Pattern C for the transmission of TP0 to effectively avoid any interference being generated from TP0. As such, in order to allow the UE to accurately measure the interference from the intended sources, the network can appropriately apply muting on the interfering TPs. This would allow the UE to determine different sets of channel status information which may be conveyed to the eNB for efficient resource allocation in CoMP. Note that only a single CSI-RS is configured since the UE needs to measure the CSI for the same TP with two different sets of interference sources.

As shown above, utilizing PDSCH RE muting allows an efficient means of measuring the interference between different TPs. From the network's perspective, such a scheme allows the network to allocate any interference that it sees appropriate. An example is provided above for dynamic blanking. Additionally, flexible interference allocation for JT and CS/CB are also possible. From a UE's perspective, the above scheme has advantages in that a UE does not need to perform interference measurement differently for different CoMP schemes or network implementations, it will measure whatever interference that is present in an interference measurement resource using its proprietary interference measurement scheme. In terms of specification support, the above scheme will not mandate an interference measurement scheme but only the resources on which interference is measured on.

Another approach is the measure interference from non-zero power CSI-RS. There are two different approaches to measuring interference from non-zero power CSI-RS.

In the first approach, the UE would measure the interference from neighboring TPs by assessing the interference level from excessive delay components from the serving TP's CSI-RS. The interference measured would include interference from TPs sharing the same Cell ID as well as inter-cell interference. Additionally, this approach could be attractive in that it would not require any specification support. However, one issue with measuring interference from the excessive delay components of CSI-RS is that there is always a chance of nearby TPs deploying PDSCH RE muting to avoid inter-TP interference on CSI-RS. Such PDSCH RE muting would make it impossible for the UE to measure the inter-TP interference from CSI-RS since there is none. The impact of not being able to fully measure inter-TP interference would lead to inaccurate CQI feedback which would have to be compensated at the eNB.

In the other approach, the UE would measure the interference from neighboring TPs directly from the CSI-RS of the neighbour TPs. The network would use RRC signalling to inform a UE which CSI-RSs it should consider for the measurement of inter-TP interference. In this approach, the inter-TP interference from TPs sharing the same Cell ID would be measured their CSI-RS while inter-cell interference can be measured from CRS. One issue with measuring interference directly from the interfering TP's CSI-RS is that it is not possible to take into account the actual PDSCH transmission activity in these TPs. In other words, if interference is measured directly from CSI-RS, the UE's interference measurement will always assume that all TPs are transmitting PDSCH leading to an inaccurate reporting of the CQI. As such, it would be up to the eNB to compensate for the inaccurate CQI report.

Another issue that needs to be considered for interference measurement resource (IMR) is that its reuse factor needs to be high enough to support unplanned network deployment. In unplanned network deployments, the IMR for a TP needs to be determined without considered the IMR for a neighboring TP. In order to do so, there needs to be a sufficient number of different IMRs to choose from. Having a large number of IMRs assures that the probability of two neighboring TPs using the same IMR to be small even if the IMRs are chosen in a random manner. Therefore, the key issue with designing IMR for an unplanned network is to make sure that there is a large number of IMRs available.

Figure 16:
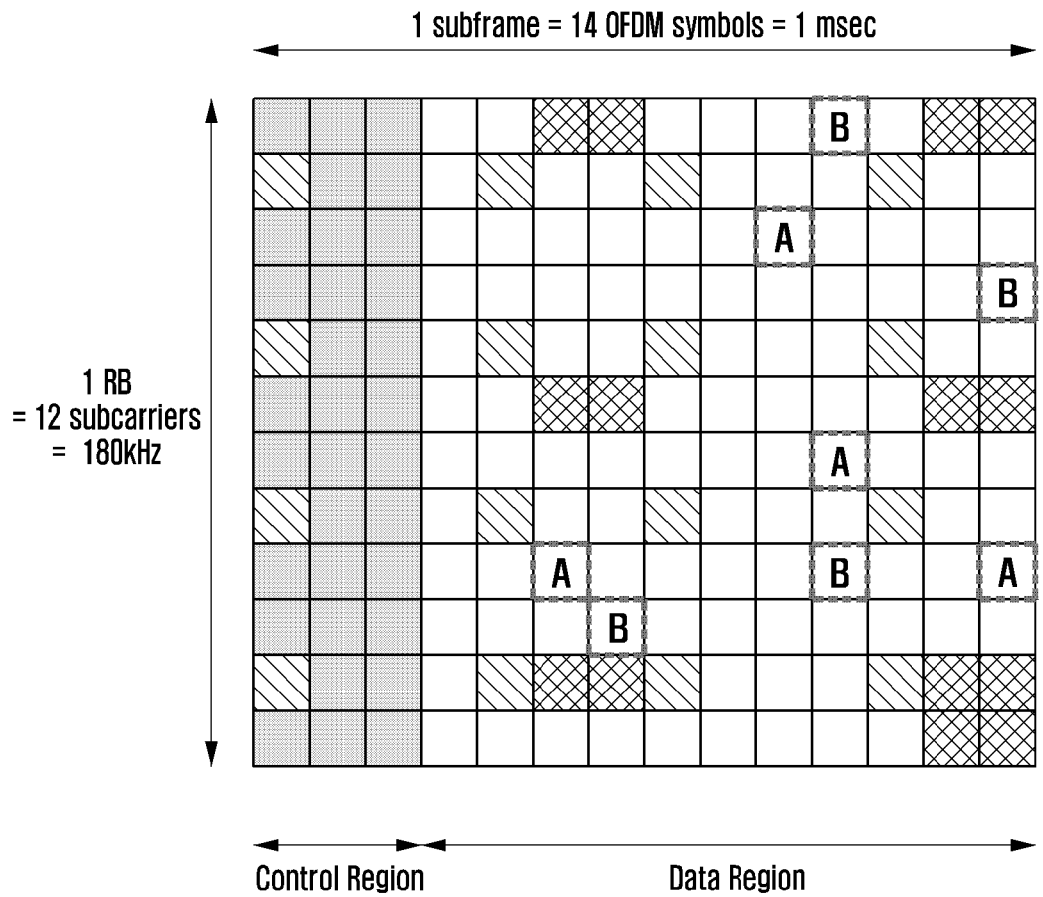
FIG. 16 illustrates an example of how two IMRs having a random pattern is defined within a PRB.

One method of enlarging the number of IMRs is to use random REs for an IMR. For a given set of REs that can be used for IMR configuration, multiple random patterns can be determined where each pattern corresponds to an IMR. FIG. 16 shows an example of how two IMRs having a random pattern is defined within a PRB.

Figure 17:
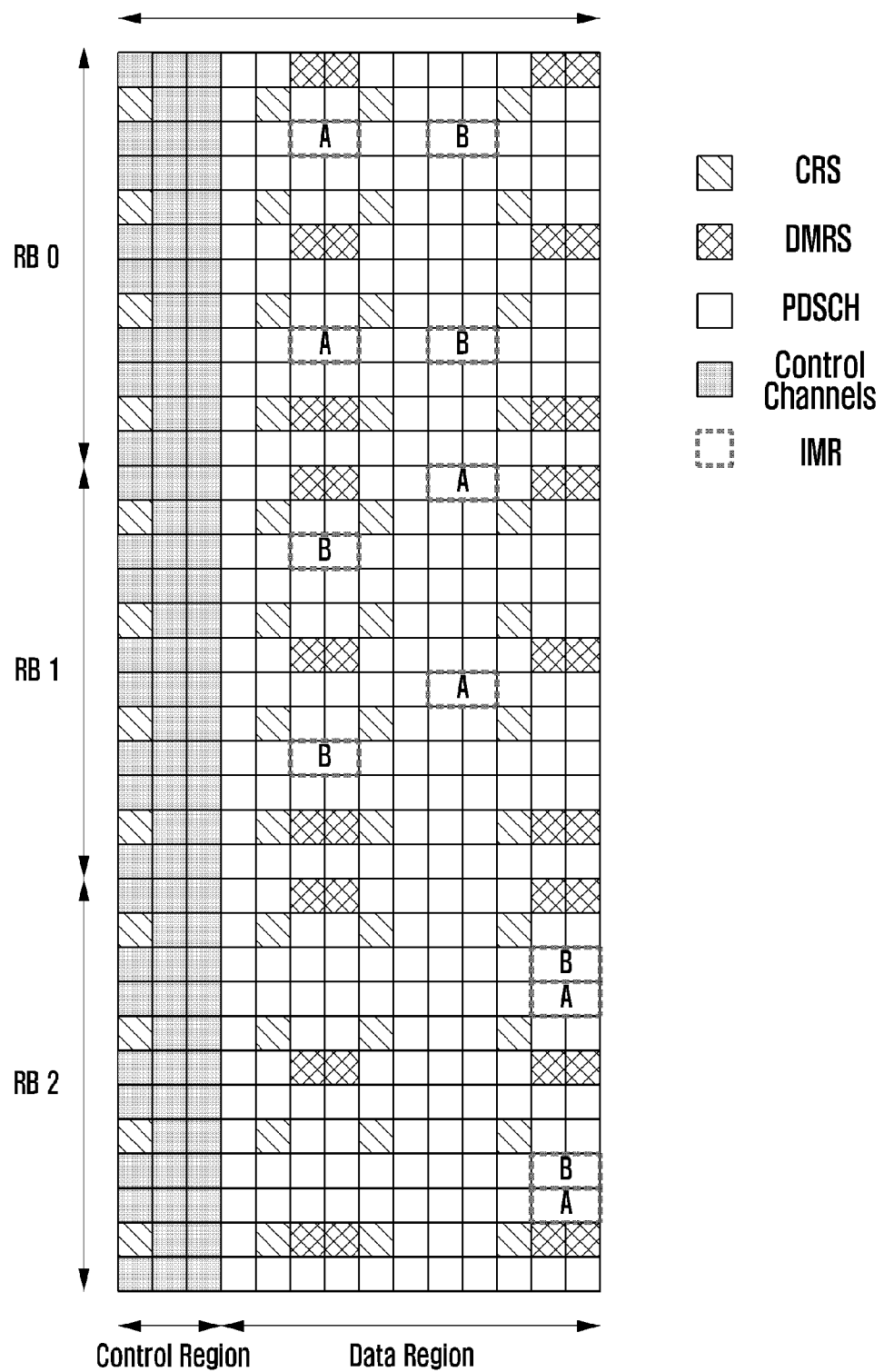
FIG. 17 illustrates another example of how two IMRs having a random pattern is defined within a PRB.

Another example is shown in FIG. 17 for IMRs based on randomized patterns.

In FIG. 17, the REs used for IMR A and IMR B are such that within a single RB, the REs for each IMR correspond to one of the zero power CSI-RSs. However, the REs for each IMR are different for each RB. For example, it can be observed that the REs for IMR A are different for RB 1, RB 2, and RB 3. Utilizing different REs for different RBs avoids the case where the IMR for one TP and the IMR for another TP collides for all RBs in the system bandwidth. In other words, by randomizing the RE location of an IMR in the frequency domain, the probability of two different IMRs sharing the same set of REs can be significantly decreased. In FIG. 17, the basic unit of randomization in the frequency domain is 4 REs of an RB which constitute a 4-port CSI-RS pattern or a zero power CSI-RS pattern. Using the 4-port CSI-RS pattern or a zero power CSI-RS pattern allows the network to deploy IMRs of randomized pattern that can efficiently coexist with the non-randomized IMR patterns of FIG. 9.

Compared to using the zero power CSI-RS patterns of FIG. 9, using a random pattern allows the definition of a larger set of IMRs. The drawback of using random patterns for IMR is that two different IMRs may not always be orthogonal to each other. Using zero power CSI-RS patterns for IMR does not have such a characteristic. The key issue in generating the random patterns for IMR is the determination of the set of REs where randomized IMR patterns can be defined and the factor that determines the randomized IMR patterns.

In an actual network deployment, different types of TPs may coexist. For example, both high power TPs and low power TPs may coexist in the system to provide both coverage and high quality data service. In such systems, part of the TPs could be deployed with careful planning while another part of the TPs could be deployed without planning. For the TPs with careful planning, the zero power CSI-RS patterns of FIG. 9 can be used to provide orthogonal IMRs while for the TPs without planning, randomized IMR patterns can be used such that a large number of IMRs can be supported.

Figure 18:
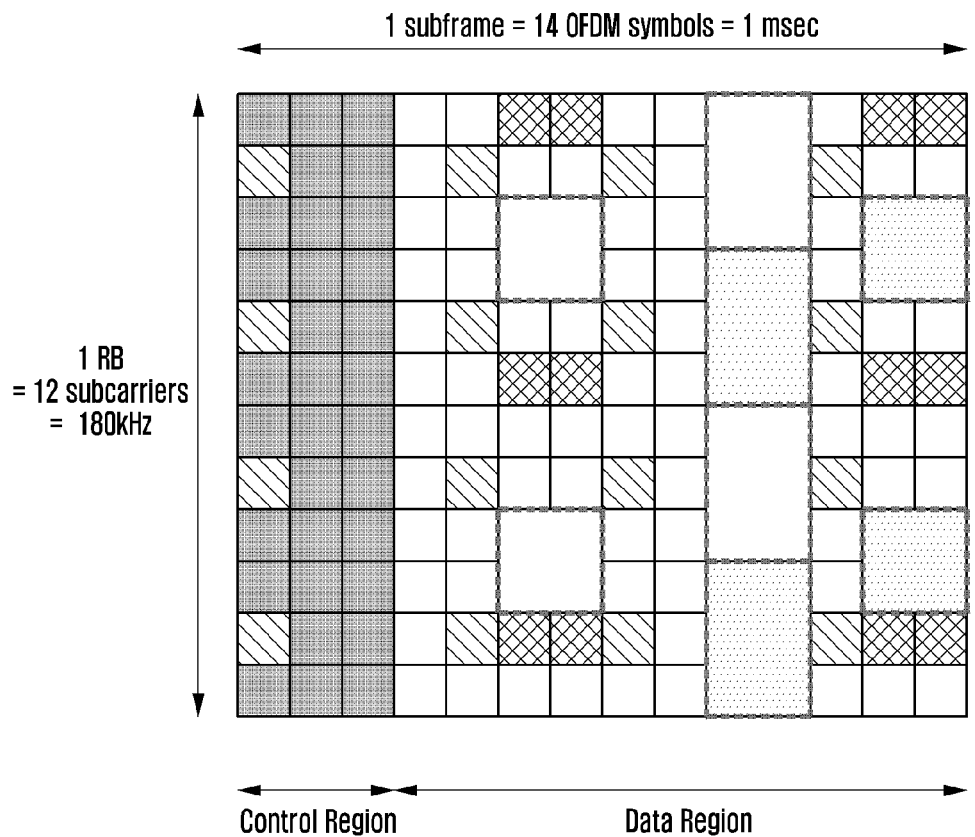
FIG. 18 illustrates an example of how IMR regions are configured.

In order for both orthogonal IMRs such as those depicted in FIG. 9 and randomized IMRs are to coexist efficiently, it is important that the specification support two different regions for IMRs. On the first IMR region, orthogonal IMRs can be defined using, for example, the zero power CSI-RS patterns of FIG. 9. On the second IMR region, randomized IMRs can be defined. FIG. 18 shows an example of how IMR regions are configured.

In FIG. 18, there are two IMR regions; IMR region 1 and IMR region 2. IMR region 1 can be used for IMRs of non-randomized patterns corresponding to the zero power CSI-RS patterns of FIG. 9. IMR region 2 can be used for IMRs of randomized patterns as shown in FIG. 16 and FIG. 17.

From a procedural point of view, in order to support the two IMR regions of FIG. 18, the network needs to notify the UE of the IMR region occupied by the IMRs of the randomized patterns. The reason for this information being necessary at the UE side is because the UE needs to know the region over which randomization can occur. Without this piece of information, the UE cannot determine the randomized patterns for IMRs. On the other hand, the UE does not need to know the IMR region occupied by the IMRs of the non-randomized patterns since this knowledge is not required in the determination of such patterns. Therefore, the information that the UE requires from the network in order to determine the REs for the randomized patterns and the non-randomized patterns include:

Randomized pattern:
Whether or not the pattern for IMR is randomized
Region of the randomized pattern
Pattern index
Non-randomized pattern:
Whether or not the pattern for IMR is randomized
Pattern index The network can restrict the REs used for the randomized IMR patterns by specifically informing the UE of the IMR region for the randomized pattern. Restricting the REs used for the randomized IMR patterns to a specific set of REs allows the network to carefully allocate non-randomized IMR patterns to TPs without having to consider whether there is collision between the non-randomized patterns and the randomized patterns.

Figure 19:
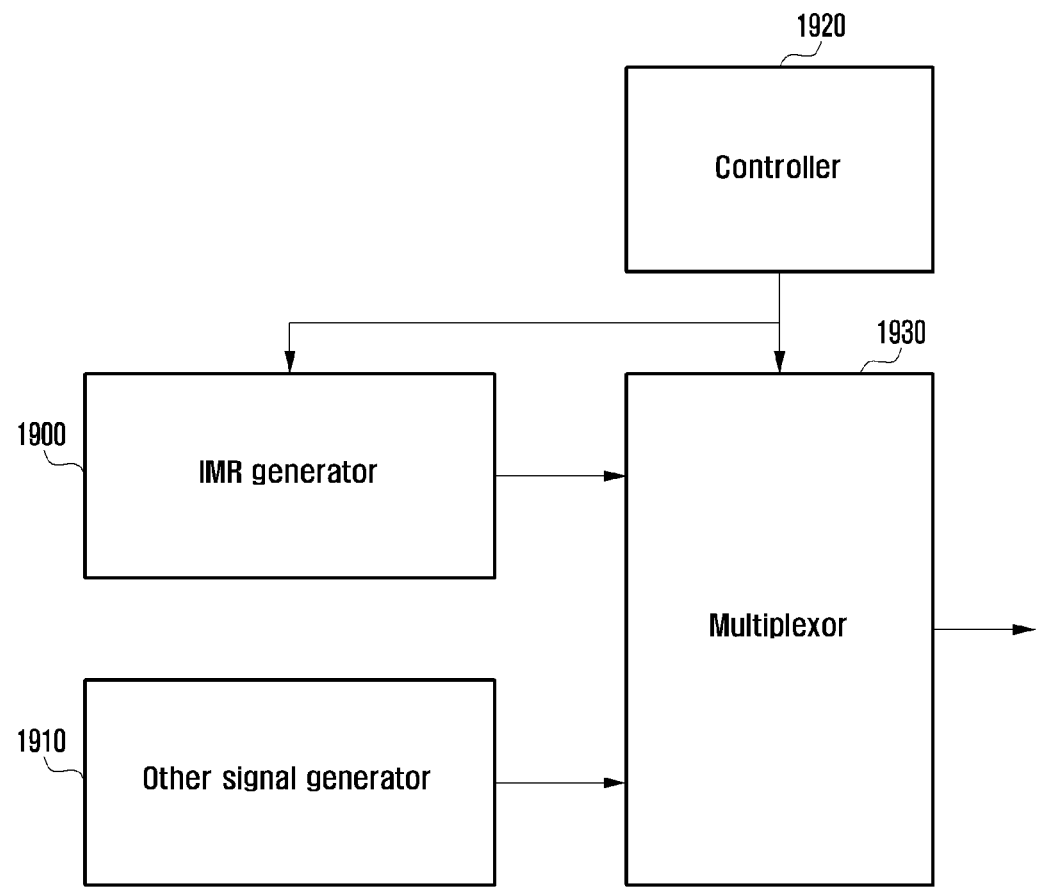
FIG. 19 illustrates an example of an eNB's hardware structure to support the randomized IMR patterns and non-randomized IMR patterns as described.

FIG. 19 shows the eNB's hardware structure to support the randomized IMR patterns and non-randomized IMR patterns as described. In FIG. 19, the IMR generator (1900) is controlled by the controller (1920) to determine the IMR pattern accordingly. Depending on whether the IMR pattern is of random pattern or non-random pattern, the controller decides the REs to be used. The REs used for IMR and the REs carrying the transmission signal is multiplexed in 1930 and transmitted accordingly.

Figure 20:
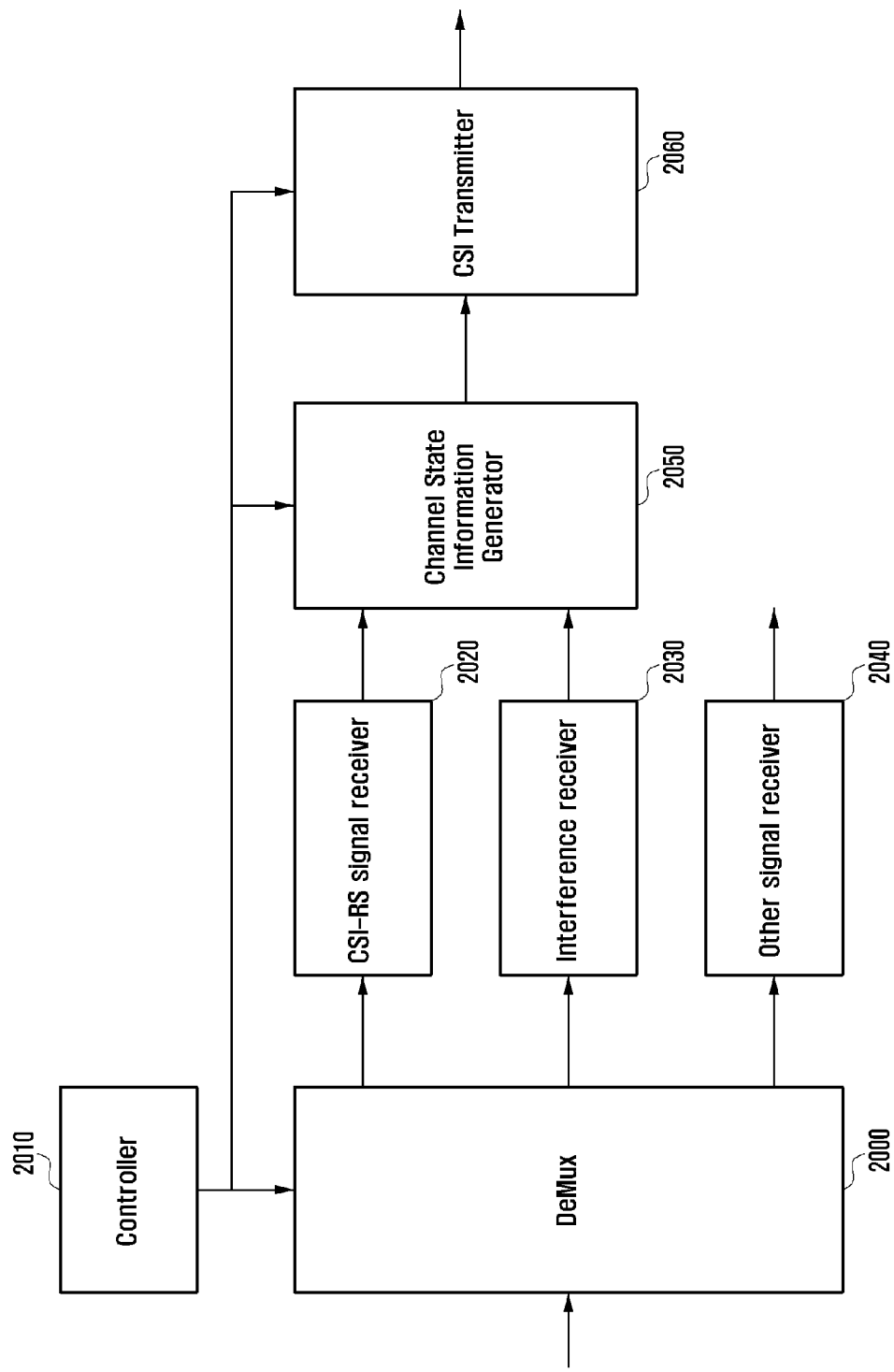
FIG. 20 illustrates an example of an UE's hardware structure to support the randomized IMR patterns and non-randomized IMR patterns as described.

FIG. 20 shows the UE's hardware structure to support the randomized IMR patterns and non-randomized IMR patterns as described. In FIG. 20, UE receives the wireless signal and performs demultiplexing on the received signal using the demultiplexor of 2000. The demultiplexing operation is dependent on where the IMR pattern which can be either randomized or non-randomized. The controller 2010 determines the location of the REs used for the IMR based on the notification from the eNB. From the received wireless signal, the UE demultiplexes the signal into the CSI-RS, IMR, and the other signals. Using the CSI-RS receiver of 2020 and the interference receiver of 2030, the UE determines the channel state information in 2050 and feedbacks the determined channel status information to the eNB using the CSI transmitter of 2060.

The invention claimed is:

1. An interference measurement method of a base station in a mobile communication system, the method comprising:
   transmitting by the base station first information for a first interference measurement resource (IMR) having a randomized pattern and second information for a second IMR having a non-randomized pattern to a terminal;
   transmitting a resource block (RB) including the first IMR and the second IMR to the terminal; and
   receiving at least one channel status information from the terminal, wherein the at least one channel status information is generated using an interference measured by the terminal based on the first IMR and second IMR.

2. The method of claim 1, wherein the first information for the first IMR includes at least one of a region for the randomized pattern and an indicator for the randomized pattern, and
   second information for the second IMR includes an indicator for the non-randomized pattern.

3. The method of claim 1, wherein the second IMR is for a part of transmission points of the base station, the part of transmission points being deployed with planning, and
   the first IMR is for another part of transmission points of the base station, the other part of transmission points being deployed without planning.

4. An interference measurement method of a terminal in a mobile communication system, the method comprising:
   receiving by the terminal first information for a first interference measurement resource (IMR) having a randomized pattern and second information for a second IMR having a non-randomized pattern, set from a base station;
   receiving a resource block (RB) including the first IMR and the second IMR from the base station;
   measuring an interference based on the first IMR and the second IMR; and
   transmitting at least one channel status information to the base station, wherein the at least one channel status information is generated using the measured interference.

5. The method of claim 4, wherein the first information for the first IMR includes at least one of a region for the randomized pattern and an indicator for the randomized pattern, and
   second information for the second IMR includes an indicator for the non-randomized pattern.

6. The method of claim 4, wherein the second IMR is for a part of transmission points of the base station, the part of transmission points being deployed with planning, and
   the first IMR is for another part of transmission points of the base station, the other part of transmission points being deployed without planning.

7. A base station of a mobile communication system, the base station comprises:
   a transceiver configured to transmit and receive signals to and from a terminal; and
   a control unit configured to:
      control the transceiver to transmit first information for a first interference measurement resource (IMR) having a randomized pattern and second information for a second IMR having a non-randomized pattern to the terminal,
      control the transceiver to transmit a resource block (RB) including the first IMR and the second IMR to the terminal, and
      control the transceiver to receive at least one channel status information from the terminal, wherein the at least one channel status information is generated using an interference measured by the terminal based on the first IMR and second IMR.

8. The base station of claim 7, wherein the first information for the first IMR includes at least one of a region for the randomized pattern and an indicator for the randomized pattern, and
   second information for the second IMR includes an indicator for the non-randomized pattern.

9. The base station of claim 7, wherein the second IMR is for a part of transmission points of the base station, the part of transmission points being deployed with planning, and
   the first IMR is for another part of transmission points of the base station, the other part of transmission points being deployed without planning.

10. A terminal of a mobile communication system, the terminal comprising:
    a transceiver configured to transmit and receive signals to and from a base station; and
    a control unit configured to:
       control the transceiver to receive first information for a first interference measurement resource (IMR) having a randomized pattern and second information for a second IMR having a non-randomized pattern, from the base station,
       control the transceiver to receive a resource block (RB) including the first IMR and the second IMR from the base station,
       measure an interference based on the first IMR and the second IMR, and
       control the transceiver to transmit at least one channel status information to the base station, wherein the at least one channel status information is generated using the measured interference.

11. The terminal of claim 10, wherein the first information for the first IMR includes at least one of a region for the randomized pattern and an indicator for the randomized pattern, and
    second information for the second IMR includes an indicator for the non-randomized pattern.

12. The terminal of claim 10, wherein the second IMR is for a part of transmission points of the base station, the part of transmission points being deployed with planning, and
    the first IMR is for another part of transmission points of the base station, the other part of transmission points being deployed without planning.

\* \* \* \* \*